US008519590B2

(12) United States Patent
Baba

(10) Patent No.: US 8,519,590 B2
(45) Date of Patent: Aug. 27, 2013

(54) MAGNETO GENERATOR WITH MULTIPLE SETS OF THREE-PHASE WINDINGS

(75) Inventor: Shinji Baba, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 11/812,431

(22) Filed: Jun. 19, 2007

(65) Prior Publication Data

US 2008/0185933 A1 Aug. 7, 2008

(30) Foreign Application Priority Data

Feb. 2, 2007 (JP) ................................. 2007-024234

(51) Int. Cl.
| H02K 1/00 | (2006.01) |
| H02K 3/00 | (2006.01) |
| H02K 17/00 | (2006.01) |
| H02K 19/00 | (2006.01) |
| H02K 21/00 | (2006.01) |
| H02K 23/26 | (2006.01) |
| H02K 27/02 | (2006.01) |
| H02K 3/28 | (2006.01) |

(52) U.S. Cl.
CPC ....................................... *H02K 3/28* (2013.01)
USPC ........... 310/198; 310/134; 310/141; 310/142; 310/156.01; 310/179; 310/184; 310/185; 310/192; 310/201

(58) Field of Classification Search
CPC ...................................................... H02K 3/28
USPC ................ 310/198, 134, 141, 142, 179, 184, 310/201, 185, 192
See application file for complete search history.

(56) References Cited

U.S. PATENT DOCUMENTS

| 1,576,615 | A | * | 3/1926 | Paulero ........................ 361/160 |
| 2,034,470 | A | * | 3/1936 | Hutchinson .................... 322/63 |
| 2,626,366 | A | * | 1/1953 | Becker et al. ................ 310/114 |
| 3,183,386 | A | * | 5/1965 | Miller .......................... 310/149 |
| 3,792,544 | A | * | 2/1974 | Foley ............................ 40/336 |
| 3,793,544 | A | * | 2/1974 | Baumgartner et al. ...... 320/123 |

(Continued)

FOREIGN PATENT DOCUMENTS

| JP | 56-053565 | 5/1981 |
| JP | 2-254950 A | 10/1990 |

(Continued)

OTHER PUBLICATIONS

Miller.pdf : Miller et al (NPL, "Design of Brushless Permanent Magnet Motors", 1994).*

*Primary Examiner* — John K Kim
(74) *Attorney, Agent, or Firm* — Sughrue Mion, PLLC

(57) ABSTRACT

A magneto generator can be made small in size and light in weight, and improved in power generation efficiency. The magneto generator includes an iron core having an iron core main body and a plurality of teeth (9) radially extending from the iron core main body, and an armature having a first three-phase winding (14) and a second three-phase winding (15) comprising winding portions (18u, 18v, 18w, 19a, 19b and 19c) of individual phases wound around the stator core. The individual first and second three-phase windings (14, 15) have the winding portions (18u, 18v, 18w, 19a, 19b and 19c) constructed by concentratedly winding conductors around the individual teeth (9), respectively, while skipping every predetermined number of teeth (9), and are wound in a state divided into an inner layer side and an outer layer side, respectively.

11 Claims, 8 Drawing Sheets

(56) References Cited

U.S. PATENT DOCUMENTS

| | | | | |
|---|---|---|---|---|
| 4,163,187 | A * | 7/1979 | Thomas | 322/29 |
| 4,336,486 | A * | 6/1982 | Gorden et al. | 322/63 |
| 4,967,464 | A * | 11/1990 | Stephens | 29/596 |
| 5,017,822 | A * | 5/1991 | Shimizu et al. | 310/207 |
| 5,274,322 | A * | 12/1993 | Hayashi et al. | 322/90 |
| 5,424,599 | A * | 6/1995 | Stroud | 310/198 |
| 5,444,355 | A * | 8/1995 | Kaneyuki et al. | 322/58 |
| 5,502,359 | A * | 3/1996 | Schemmann et al. | 310/40 MM |
| 6,166,471 | A * | 12/2000 | Kometani et al. | 310/198 |
| 6,465,923 | B2 * | 10/2002 | Amrhein | 310/90.5 |
| 6,788,031 | B2 * | 9/2004 | Pendell | 322/44 |
| 6,864,667 | B2 * | 3/2005 | Buening et al. | 322/90 |
| 6,943,476 | B2 * | 9/2005 | Regazzi et al. | 310/156.47 |
| 6,998,750 | B2 * | 2/2006 | Anma et al. | 310/198 |
| 7,271,517 | B2 * | 9/2007 | Uemura et al. | 310/153 |
| 7,351,935 | B2 * | 4/2008 | Konishi | 219/270 |
| 2004/0090136 | A1 * | 5/2004 | Uemura et al. | 310/156.26 |
| 2004/0251762 | A1 * | 12/2004 | Regazzi et al. | 310/156.47 |
| 2005/0236921 | A1 * | 10/2005 | Yoneda et al. | 310/179 |
| 2007/0194650 | A1 * | 8/2007 | Ito et al. | 310/179 |
| 2008/0185933 | A1 * | 8/2008 | Baba | 310/198 |

FOREIGN PATENT DOCUMENTS

| | | |
|---|---|---|
| JP | 2003-319591 | 11/2003 |
| JP | 2004-166381 | 6/2004 |
| JP | 2004-328917 | 11/2004 |

* cited by examiner

⊗ : START OF WINDING
⊙ : END OF WINDING

MAGNETO GENERATOR WITH MULTIPLE SETS OF THREE-PHASE WINDINGS

BACKGROUND OF THE INVENTION

1. Field of the Invention

The present invention relates to a three-phase rotating electrical machine such as for example a magneto generator with an armature having a plurality of three-phase windings wound around an iron core.

2. Description of the Related Art

In the past, there has been known a vehicular alternator with two three-phase windings wound in the same slots (see, for example, a first patent document: Japanese patent application laid-open No. 2006-87248 (paragraph No. [0028] on page 7 and FIG. 2).

In this vehicular alternator, the winding portions of the individual phases constituting the three-phase windings have conductors wound up in a waveform beforehand, and are inserted into slots formed between adjacent ones of a plurality of teeth arranged to radially extend from an iron core main body so as to be wound around a fixed stator core.

In this vehicular alternator, the winding portions are wound around the stator core in a so-called distributed winding in which the conductors are wound around the fixed iron core in a circumferential direction in a state astride nine slots, as shown in FIG. 2 of the above-mentioned patent document.

In the case of the winding portions constructed in such a distributed winding, the conductors protrude from an end face of the stator core to stride over the nine slots to extend to the following slot, thus posing the following problem. That is, the circumferential length of the conductors becomes long, so the weight thereof is heavy and the electric resistance of the winding portions increases, resulting in low power generation efficiency of the magneto coil formed of the winding portions.

In addition, the height of a coil end of the magneto coil protruding from an end face of the stator core is high, so there is also another problem that the axial dimension of a stator having the magneto coil wound around the stator core is large.

SUMMARY OF THE INVENTION

Accordingly, the present invention is intended to obviate the problems as referred to above, and has for its object to obtain a rotating electrical machine which can be made small in size and light in weight, and can be improved in the operating efficiency thereof.

In one aspect, a three-phase rotating electrical machine according to the present invention includes an iron core having an iron core main body and a plurality of teeth radially extending from the iron core main body, and an armature having a plurality of sets of three-phase windings comprising winding portions of individual phases wound around the iron core. Each of the three-phase windings is constructed in such a manner that the winding portion has a conductor concentratedly wound around the individual teeth while skipping every predetermined number of teeth, and at the same time each of the three-phase windings is wound in a state divided into an inner layer side and an outer layer side.

In another aspect, a three-phase rotating electrical machine according to the present invention includes an iron core having an iron core main body and a plurality of teeth radially extending from the iron core main body, and an armature having a plurality of sets of three-phase windings comprising winding portions of individual phases wound around the iron core. Each of the three-phase windings is constructed in such a manner that the winding portion has a conductor concentratedly wound around the individual teeth while skipping every predetermined number of teeth, and at the same time, each of the three-phase windings is wound in a state divided into an inner diameter side and an outer diameter side.

According to the present inventor, it is possible to make a three-phase rotating electrical machine small in size and light in weight as well as to improve the operating efficiency thereof.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Figure 1:
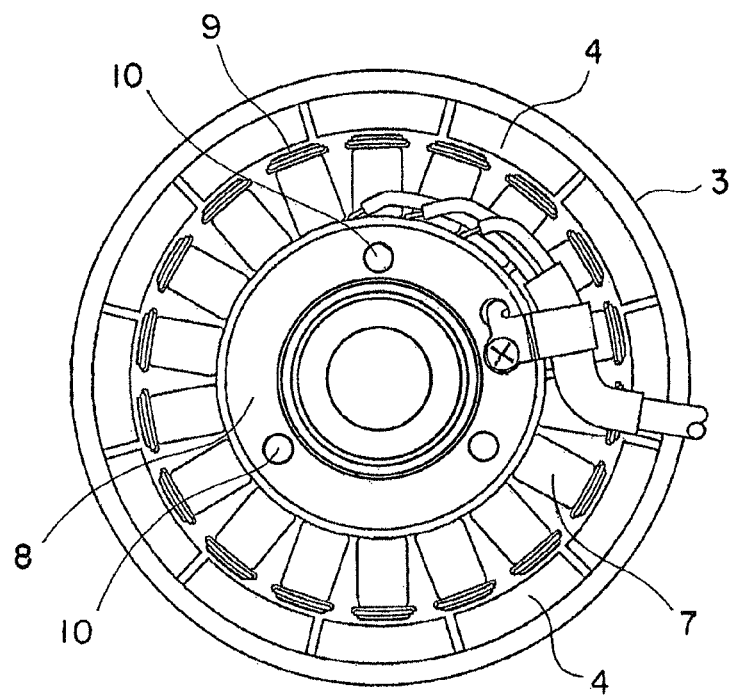
FIG. 1 is a front elevational view showing a magneto generator according to a first embodiment of the present invention.

Now, preferred embodiments of the present invention will be described in detail while referring to the accompanying drawings. Throughout respective figures, the same or corresponding members or parts are identified by the same reference numerals and characters.

Embodiment 1

Figure 2:
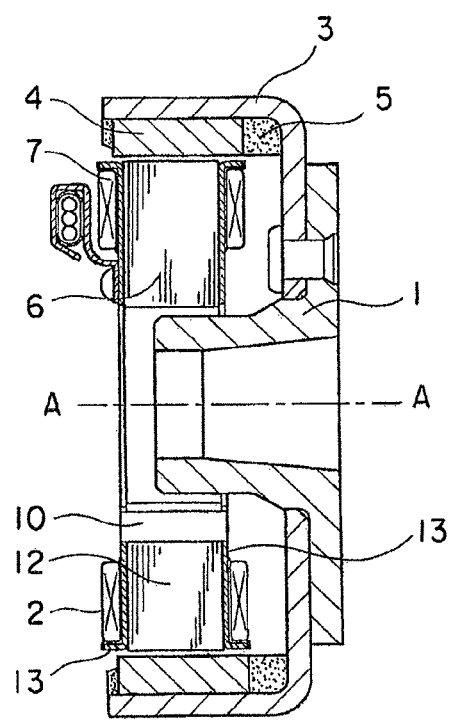
FIG. 2 is a cross sectional side view of the magneto generator of FIG. 1.
Figure 3:
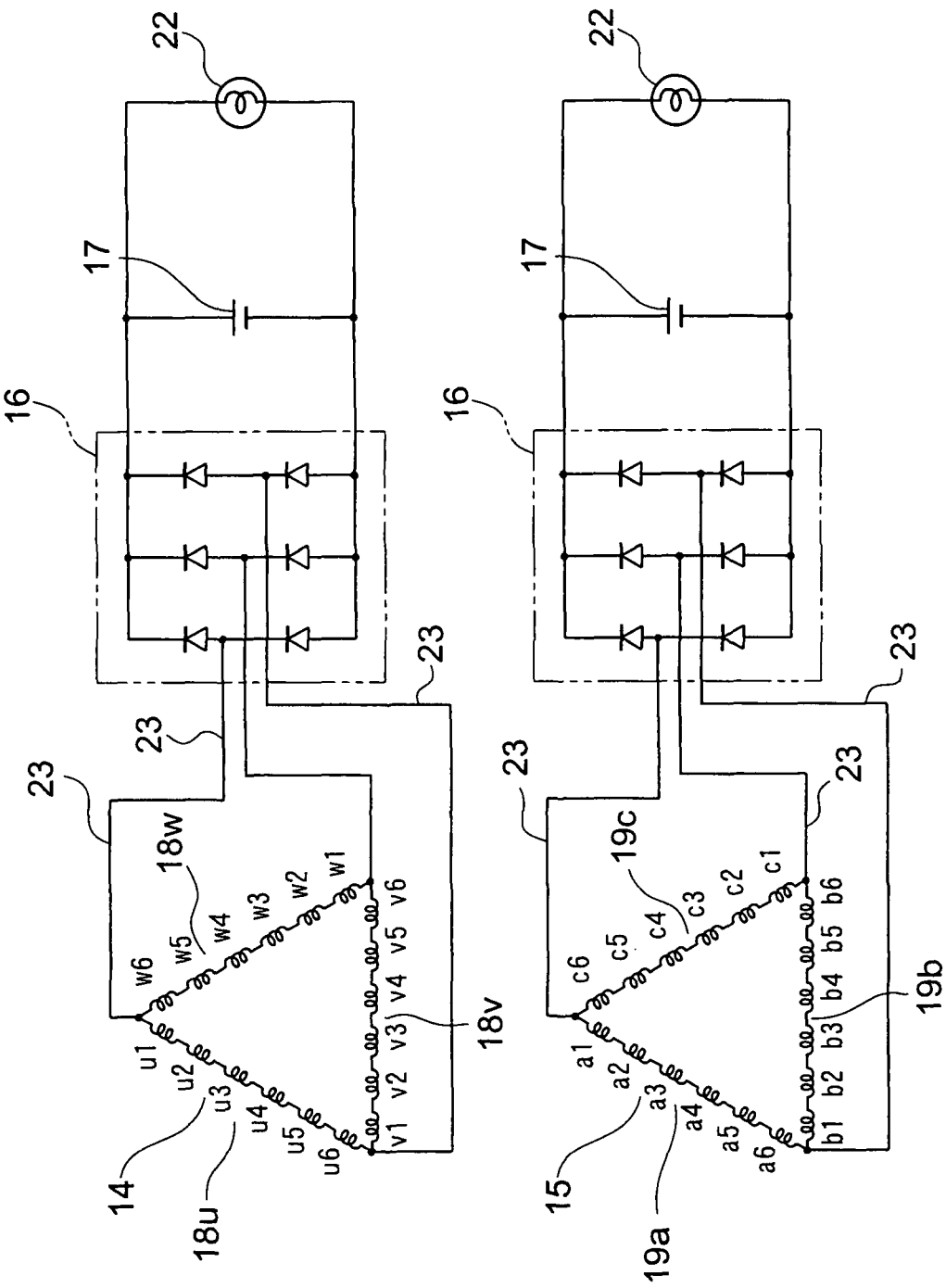
FIG. 3 is an electric circuit diagram of the magneto generator of FIG. 1.

Referring to the drawings and first to FIG. 1, there is shown, in a front elevational view, a magneto generator according to a first embodiment of the present invention. FIG. 2 is a cross sectional side elevational view of the magneto generator of FIG. 1, and FIG. 3 is an electric circuit diagram of the magneto generator of FIG. 1.

This magneto generator, serving as a rotating electric machine, is provided with a rotor 1 operatively connected with an internal combustion engine, and a stator 2 disposed at an inner side of the rotor 1.

The rotor 1 has a bowl-shaped flywheel 3 and a plurality of permanent magnets 4 fixedly attached to an inner wall surface of the flywheel 3. The rotor 1 rotates about an axis of rotation A-A.

The permanent magnets 4 are fixedly attached to an inner peripheral surface of a cylindrical portion of the flywheel 3 at equal angular intervals with respect to one another around the axis of rotation A-A by means of molding members 5 (omitted in FIG. 1).

The plurality of permanent magnets 4 are polarized in such a manner that adjacent permanent magnets 4 have mutually opposite polarities, whereby in an inner side space of the permanent magnets 4, there is generated a magnetic field, the direction of which changes alternately.

The stator 2 has a hollow cylindrical stator core 6 and a magneto coil 7. The stator core 6 with its entire surface covered with an insulating film has an annular iron core main body 8, and a plurality of teeth 9 protruding from the iron core main body 8 radially in diametrically outer directions at circumferentially equal intervals.

A plurality of through holes 10 are formed through the stator core 6 at circumferential intervals. The stator 2 is fixedly secured to a non-rotating member in the form of a bracket (not shown) by means of a plurality of mounting bolts (not shown) that extend through the through holes 10 to be threaded to the bracket.

The stator core 6, serving as an iron core, has a laminated body 12 that is formed of a multitude of intermediate plates comprising thin magnetic steel plates (e.g., cold rolled steel sheets such as SPCC) of a doughnut disk shape laminated one over another along the direction of the axis of rotation A-A, and a pair of end plates 13 that are superposed on the opposite side surfaces of the laminated body 12, respectively, in intimate contact therewith.

As shown in FIG. 3, the magneto coil 7 is formed of a first three-phase winding 14 and a second three-phase winding 15 which are wound around the stator core 6. The first three-phase winding 14 and the second three-phase winding 15 are individually electrically connected to commutators 16, respectively, which are each connected in parallel to a battery 17 and an electric load 22 such as a headlight.

Figure 4:
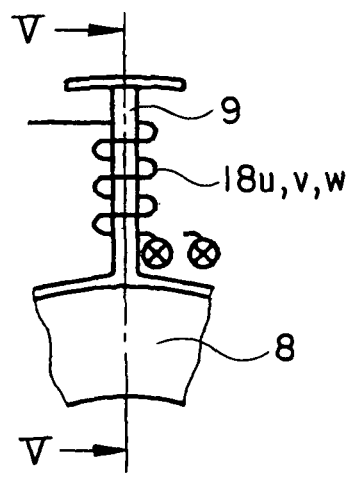
FIG. 4 is a front elevational view of essential portions of the magneto generator of FIG. 1.
Figure 5:
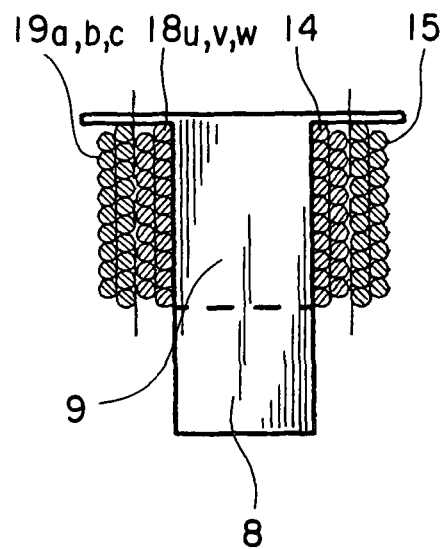
FIG. 5 is a cross sectional arrow view along line V-V in FIG. 4.

As shown in FIGS. 4, 5, the first three-phase winding 14 is arranged at an inner layer side, and the second three-phase winding 15 is arranged at an outer layer side.

Figure 6:
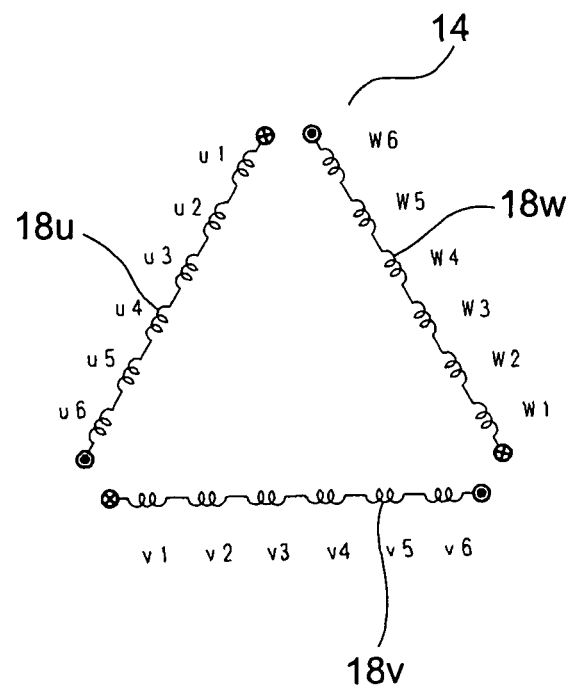
FIG. 6 is a connection diagram showing a first three-phase winding of a magneto coil of FIG. 1.
Figure 7:
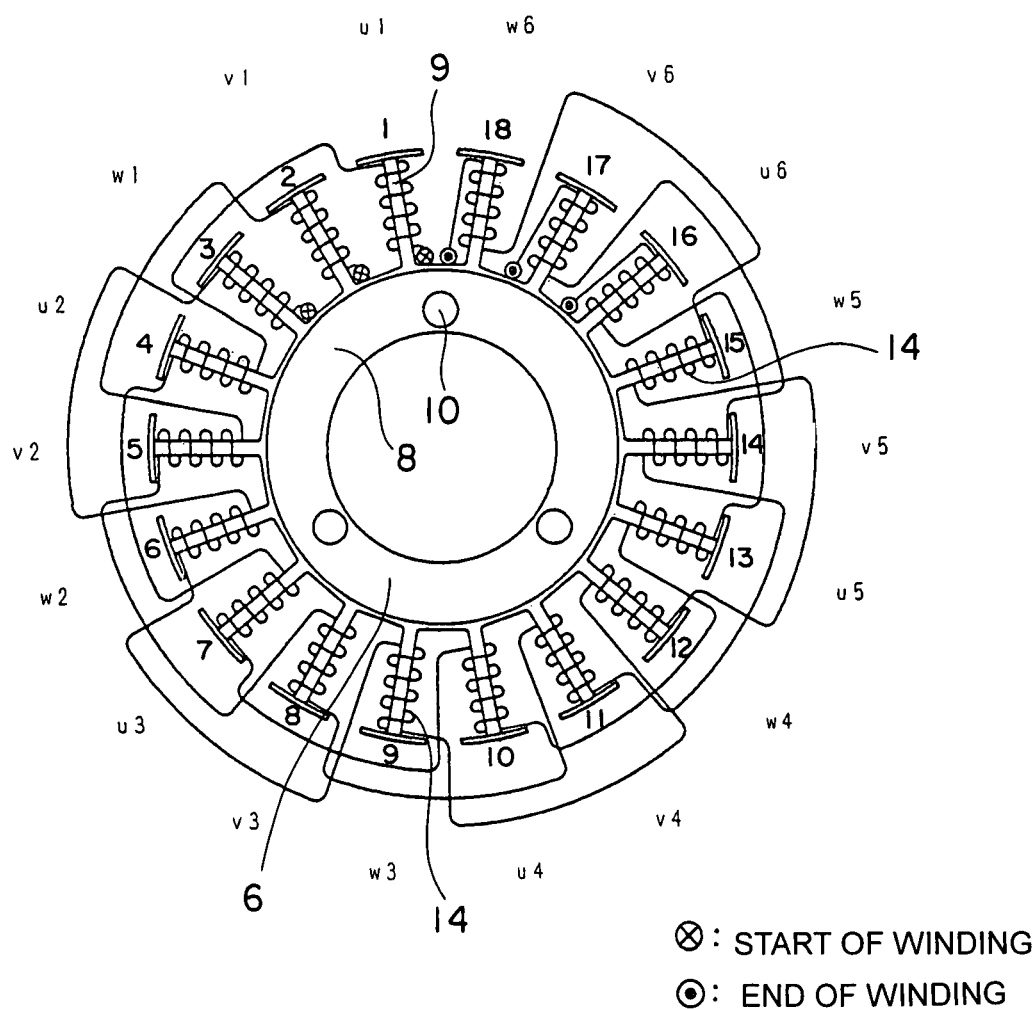
FIG. 7 is a winding diagram showing the state of winding of a first three-phase winding wound around a stator core of FIG. 1.

FIG. 6 is a connection diagram of the first three-phase winding 14, and FIG. 7 is a winding diagram showing the state of winding of the first three-phase winding 14 wound around the stator core 6.

The first three-phase winding 14 at the inner layer side has individual ends of a U phase winding portion 18*u*, a V phase winding portion 18*v*, and a W phase winding portion 18*w* connected to one another in a delta configuration.

The U phase winding portion 18*u* is formed by continuously and concentratedly winding a conductor around individual teeth 9 from No. 1 to No. 16 through No. 4, No. 7, No. 10 and No. 13 in an anti-clockwise direction while skipping every two teeth 9.

Similarly, the V phase winding portion 18*v* is formed by continuously and concentratedly winding a conductor around individual teeth 9 from No. 2 to No. 17 through No. 5, No. 8, No. 11 and No. 14 in an anti-clockwise direction while skipping every two teeth 9.

Also, the V phase winding portion 18*w* is formed by continuously and concentratedly winding a conductor around individual teeth 9 from No. 3 to No. 18 through No. 6, No. 9 No. 12 and No. 15 in an anti-clockwise direction while skipping every two teeth 9.

The first three-phase winding 14 has individual ends of the U phase winding portion 18*u*, the V phase winding portion 18*v*, and the W phase winding portion 18*w* connected to one another in a delta configuration, so that it is connected from this connection portion to a commutator 16 through output lines 23.

The second three-phase winding 15 at an outer layer side has individual ends of an A phase winding portion 19*a*, a B phase winding portion 19*b*, and a C phase winding portion 19*c* connected to one another in a delta configuration.

The A phase winding portion 19*a*, the B phase winding portion 19*b* and the C phase winding portion 19*c* are also formed by continuously and concentratedly winding the individual conductors around the corresponding teeth 9, respectively, in an anti-clockwise direction while skipping every two teeth 9, as in the case of the U phase winding portion 18*u*, the V phase winding portion 18*v* and the W phase winding portion 18*w*.

The second three-phase winding 15 has individual ends of the A phase winding portion 19*a*, the B phase winding portion 19*b*, and the W phase winding portion 19*c* connected to one another in a delta configuration, so that it is connected from this connection portion to another commutator 16 through output lines 23.

The individual numbers of turns of conductors for the A phase winding portion 19*a*, the B phase winding portion 19*b* and the C phase winding portion 19*c*, respectively, are equal to the individual numbers of turns of conductors for the U phase winding portion 18*u*, the V phase winding portion 18*v* and the W phase winding portion 18*w*, respectively.

Thus, the number of teeth 9 is eighteen, and the winding portions 18*u*, 18*v*, 18*w*, 19*a*, 19*b* and 19*c* of the same phases are constructed by concentratedly winding the individual conductors around the teeth 9 while skipping every two teeth 9. In addition, the winding portions 18*u*, 18*v*, 18*w*, 19*a*, 19*b* and 19*c* of the individual phases are arranged in a positional relation displaced by one tooth 9 from one another in the circumferential direction.

Figure 8:
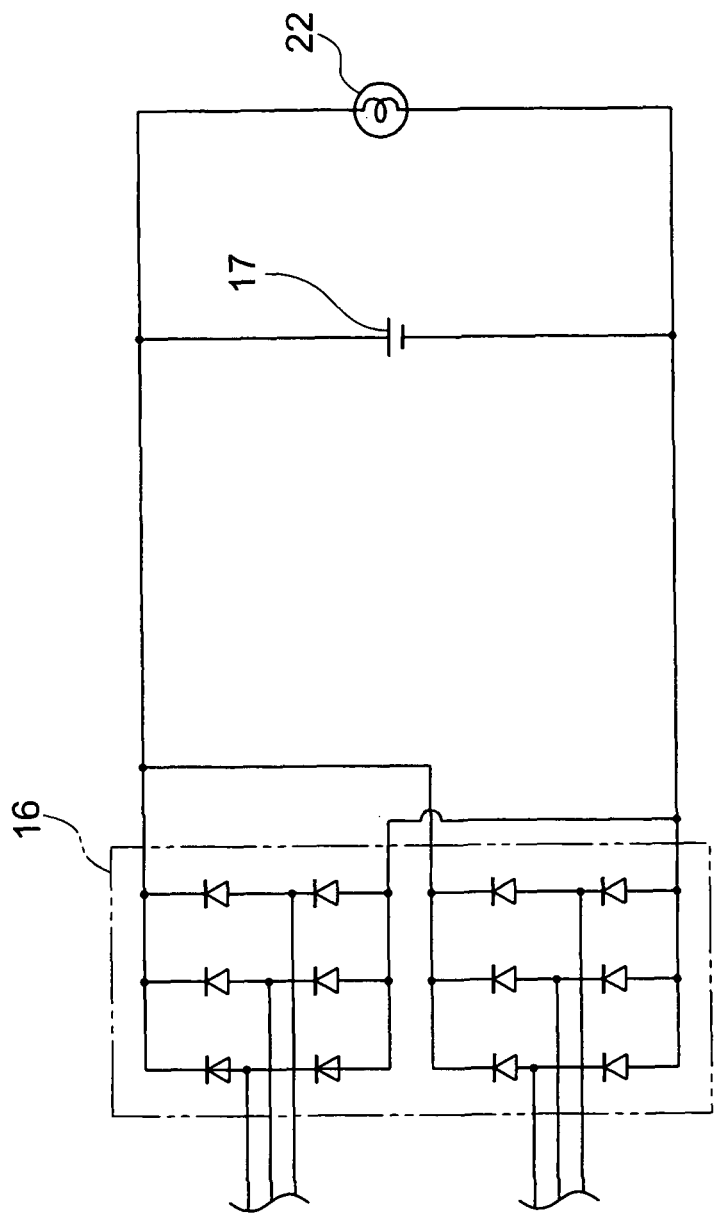
FIG. 8 is an electric circuit diagram of a modified form of magneto generator, different from that of FIG. 1, according to the present invention.

Here, note that, as shown in FIG. 8, a pair of commutators 16 connected to the first three-phase winding 14 and the second three-phase winding 15, respectively, may be connected in parallel to each other, and a battery 17 and an electric load 22 may be connected in parallel to the commutators 16 thus connected in parallel to each other.

In the magneto generator as constructed above, the flywheel 3 is rotated in association with a rotation shaft of the rotor which is driven to rotate by the internal combustion engine, and in this case, electric power is generated in the first three-phase winding 14 and in the second three-phase winding 15 by an alternating field generated by the permanent magnets 4. The ac outputs thus generated are commutated by the commutators 16, and are supplied to the vehicle-mounted battery 17 and the electric load 22.

As described in the foregoing, according to the magneto generator of this embodiment, the first three-phase winding 14 and the second three-phase winding 15 have the winding portions 18*u*, 18*v*, 18*w*, 19*a*, 19*b* and 19*c* of the same phases constructed by concentratedly winding the individual conductors around the individual teeth 9 while skipping every two teeth 9, so the length of the conductors extending across each end face of the stator core 6 becomes short, and the total length of the conductors is accordingly shortened to a great extent.

Accordingly, the magneto generator can be made light in weight, and the electric resistance of the winding portions 18u, 18v, 18w, 19a, 19b and 19c can be reduced, thus making it possible to improve the power generation efficiency thereof.

In addition, the height of each coil end of the magneto coil protruding from a corresponding end face of the stator core becomes small, so the axial dimension of the stator 2 can be shortened, and the size thereof can be reduced.

Further, the first three-phase winding 14 is wound or arranged at the inner layer side, and the second three-phase winding 15 is wound or arranged at the outer layer side, with the different conductors of three-phase windings being continuously and concentratedly wound around the individual teeth 9, respectively. With such an arrangement, it becomes possible to freely set the positions of the starting point and the ending point of each of the winding portions 18u, 18v, 18w, 19a, 19b and 19c of the individual phases, so the wire connection work for the respective ends of the winding portions 18u, 18v, 18w, 19a, 19b and 19c of the individual phases can be made easy, thereby making it possible to reduce the cost of production.

Furthermore, the individual numbers of turns of conductors for the A phase winding portion 19a, the B phase winding portion 19b and the C phase winding portion 19c, respectively, are equal to the individual numbers of turns of conductors for the U phase winding portion 18u, the V phase winding portion 18v and the W phase winding portion 18w, respectively, so the first three-phase winding 14 and the second three-phase winding 15 generate electricity at substantially the same output, and hence are connected to the commutators 16 of the same specification, respectively.

Embodiment 2

Figure 9:
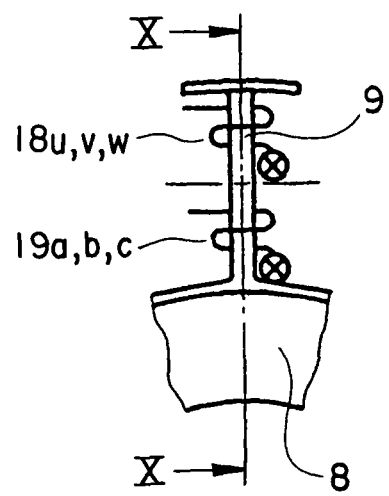
FIG. 9 is a front elevational view showing essential portions of the magneto generator according to a second embodiment of the present invention.
Figure 10:
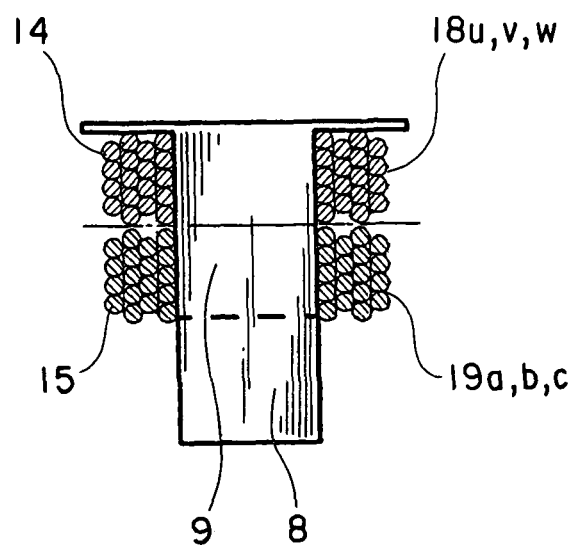
FIG. 10 is a cross sectional arrow view along line X-X of FIG. 9.

FIG. 9 is a front elevational view showing essential portions of a magneto generator according to the second embodiment of the present invention, and FIG. 10 is a cross sectional arrow view along line X-X of FIG. 9.

In this second embodiment, of three-phase windings, a first three-phase winding 14 is wound or arranged at an outer diameter side, and a second three-phase winding 15 is wound or arranged at an inner diameter side. The other construction of this second embodiment is similar to that of the first embodiment.

In this second embodiment, the first three-phase winding 14 is arranged at the outer diameter side, and the second three-phase winding 15 is arranged at the inner diameter side, with the different conductors of the three-phase windings 14, 15 being concentratedly wound around the individual teeth 9, respectively. With such an arrangement, it becomes possible to freely set the positions of the starting point and the ending point of each of the winding portions 18u, 18v, 18w, 19a, 19b and 19c of the individual phases, so the wire connection work for the respective ends of the winding portions 18u, 18v, 18w, 19a, 19b and 19c of the individual phases can be made easy, thereby making it possible to reduce the cost of production.

Figure 11:
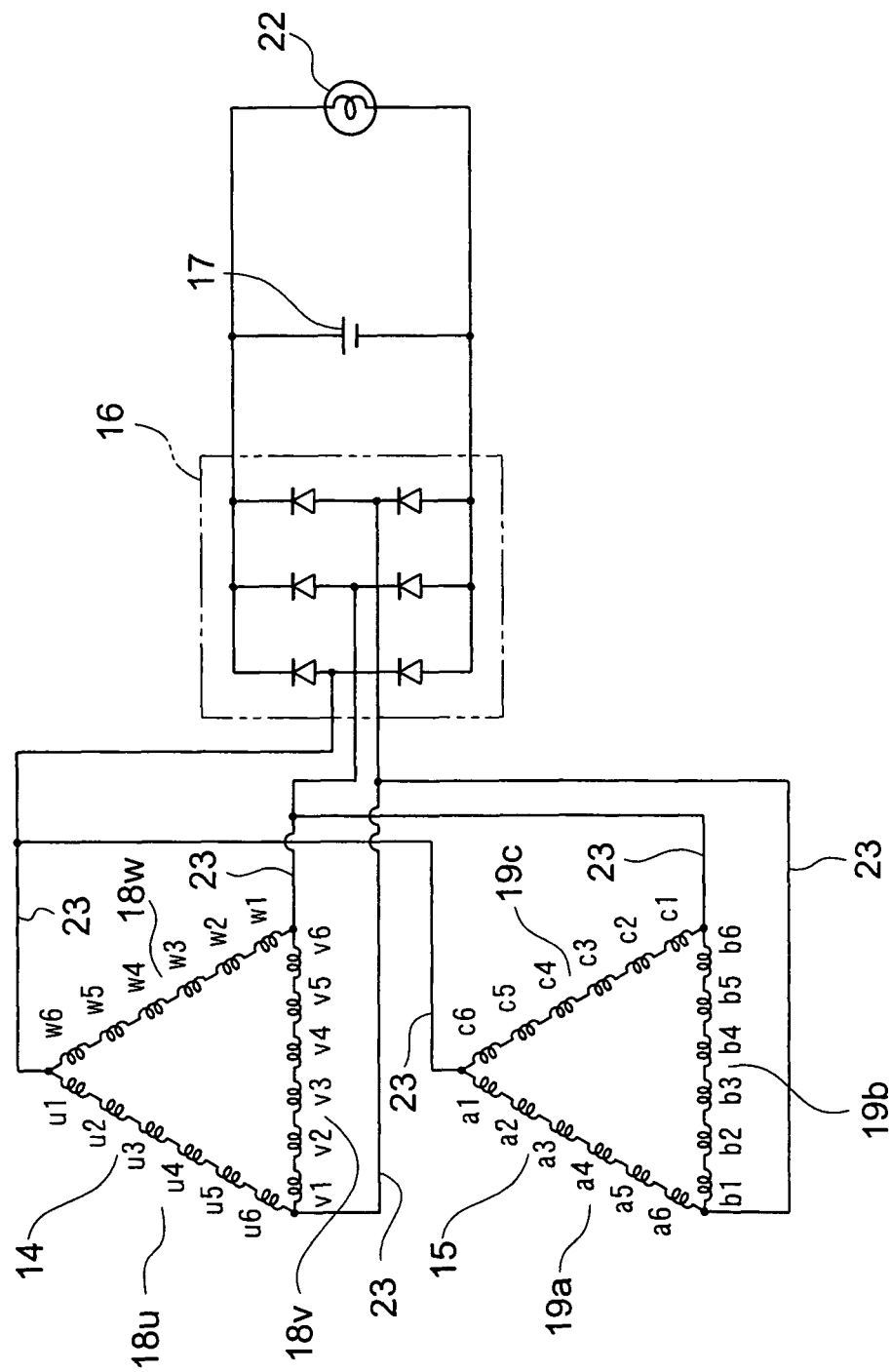
FIG. 11 is an electric circuit diagram of a magneto generator, different from those of FIGS. 1 and 2, according to a third embodiment of the present invention.

Although in the above-mentioned respective embodiments, reference has been made to magneto generators in which the first three-phase winding 14 and the second three-phase winding 15 are electrically connected to the individual commutators 16 separately from each other, the present invention can be applied to a magneto generator in which, as shown in FIG. 11, a first three-phase winding 14 and a second three-phase winding 15 may be connected in parallel to each other by means of output lines 23 of individual phases, and the first and second three-phase windings 14, 15 thus connected in parallel to each other may be connected to a commutator 16.

In addition, the present invention can also be applied to the first and second three-phase windings 14, 15 with the winding portions 18u, 18v, 18w, 19a, 19b and 19c of the individual phases being connected in a Y connection. Moreover, the number of teeth 9 of the stator core 6 need not be limited to 18, but may instead be 3n (i.e., n being an arbitrary integer). Further, the present invention can also be applied to generators other than magneto generators or to electric motors in which an armature is rotating. Furthermore, the present invention may be applied to rotating electrical machines in which three or more sets of three-phase windings are wound around an iron core.

While the invention has been described in terms of preferred embodiments, those skilled in the art will recognize that the invention can be practiced with modifications within the spirit and scope of the appended claims.

What is claimed is:

1. A magneto generator with multiple sets of three-phase windings comprising:
   an iron core having an iron core main body and a plurality of teeth radially extending from said iron core main body; and
   an armature having a plurality of sets of three-phase windings comprising winding portions of individual phases wound around the plurality of teeth of said iron core;
   wherein each of said three-phase windings is constructed in such a manner that each of said winding portions comprises conductor continuously concentratedly wound around individual teeth from the plurality of teeth while skipping every predetermined number of teeth, and each of said three-phase windings is wound in the same direction and same number of turns,
   wherein conductors of a first three-phase winding of the plurality of sets of three-phase windings are wound around the plurality of teeth to circumferentially form an inner conductor layer on the teeth on which the conductors of the first three-phase winding are wound, and
   wherein conductors of a second three-phase winding of the plurality of sets of three-phase windings are wound around the plurality of teeth to circumferentially form an outer conductor layer on the inner conductor layer on the teeth on which the conductors of the second three-phase winding are wound.

2. A magneto generator with multiple sets of three-phase windings comprising:
   an iron core having an iron core main body and a plurality of teeth radially extending from said iron core main body; and
   an armature having a plurality of sets of three-phase windings comprising winding portions of individual phases wound around said plurality of teeth;
   wherein each of said winding portions comprises a conductor continuously concentratedly wound around individual teeth from the plurality of teeth while skipping every predetermined number of teeth, and each of said three-phase windings is wound in the same direction and with the same number of turns of said conductor,
   wherein each of said teeth is divided into an inner diameter portion designated for a first set of the three-phase windings which are all wound in one direction and an outer diameter portion designated for a second set of the three-phase windings which are all wound in said one direction, with respect to a rotary axis of the machine,
   wherein each of said three-phase windings are distributed about the entire circumference of the armature, and
   wherein each of the winding portions of each set of windings is connected to one another in a delta configuration.

3. The magneto generator as set forth in claim 1 or 2, wherein said armature is a stator of a magneto generator.

4. The magneto generator as set forth in claim 1 or 2, wherein said individual three-phase windings are electrically connected to commutators separately from each other.

5. The magneto generator as set forth in claim 1 or 2, wherein said individual three-phase windings have output lines of said winding portions of the individual phases connected in parallel to each other.

6. The magneto generator as set forth in claim 1, wherein said three-phase windings are constructed in such a manner that a first winding portion of one of the three-phase windings and a second winding portion of said one of the three-phase windings are electrically connected to same element of a commutator.

7. The magneto generator as set forth in claim 1, wherein the first three-phase winding and the second three-phase winding are each connected in a delta configuration.

8. The magneto generator as set forth in claim 1 or 2, wherein each tooth of the armature has two conductors wound thereon, one from each of a first three-phase winding and a second three-phase winding.

9. The magneto generator as set forth in claim 2, wherein a first three-phase winding and a second three-phase winding out of the three-phase windings are wound around same tooth being electrically isolated from each other.

10. The magneto generator as set forth in claim 2, wherein each of said three-phase windings is constructed in such a manner that a first phase winding of said three-phase windings is wound around a first tooth from the plurality of teeth, a second phase winding of said three-phase windings is wound around a second tooth from the plurality of teeth, and a third phase winding of said three-phase windings is wound around a third tooth from the plurality of teeth and such pattern is repeated for remaining teeth of the plurality of teeth, each wound around said individual teeth while skipping same predetermined number of teeth.

11. The magneto generator as set forth in claim 1 or 2, further comprising:
 a flywheel attached to a rotor, comprising a plurality of permanent magnets fixedly attached to an inner wall surface of the flywheel, and configured to generate an alternating magnet field.

\* \* \* \* \*